(12) United States Patent
Itadani (10) Patent No.: US 10,352,453 B2
(45) Date of Patent: Jul. 16, 2019

(54) SEAL DEVICE (71) Applicant: EAGLE INDUSTRY CO., LTD., Minato-ku, Tokyo (JP)

(72) Inventor: Masatoshi Itadani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/512,011

(22) PCT Filed: Aug. 26, 2015

(86) PCT No.: PCT/JP2015/074083
§ 371 (c)(1),
(2) Date: Mar. 16, 2017

(87) PCT Pub. No.: WO2016/059883
PCT Pub. Date: Apr. 21, 2016

(65) Prior Publication Data
US 2017/0299063 A1 Oct. 19, 2017

(30) Foreign Application Priority Data

Oct. 18, 2014 (JP) .................................. 2014-213251

(51) Int. Cl.
*F16J 15/34* (2006.01)
*F16C 33/74* (2006.01)
(Continued)

(52) U.S. Cl.
CPC .............. *F16J 15/34* (2013.01); *F16C 17/02* (2013.01); *F16C 33/74* (2013.01); *F16J 15/32* (2013.01);
(Continued)

(58) Field of Classification Search
CPC .. F16J 15/34; F16J 15/32; F16C 33/74; F16C 17/02; F16C 37/002
See application file for complete search history.

(56) References Cited

U.S. PATENT DOCUMENTS 4,793,722 A * 12/1988 Jensen ................... F01D 25/164
384/222
4,928,978 A * 5/1990 Shaffer ................. F01D 25/183
277/401
(Continued)

FOREIGN PATENT DOCUMENTS

CN 101644334 A 2/2010
CN 201487204 U 5/2010
(Continued)

OTHER PUBLICATIONS

International Search Report (ISR) dated Nov. 10, 2015, issued for International application No. PCT/JP2015/074083.
(Continued)

*Primary Examiner* — Eugene G Byrd
(74) *Attorney, Agent, or Firm* — Law Office of Katsuhiro Arai (57) ABSTRACT

The concentration of a sealed fluid in the vicinity of a sliding face between a stationary-side seal ring and a rotating-side seal ring is prevented without increasing the number of components and without providing a large-scale external circulation device. A seal cavity includes a radial sliding bearing 11, 25 for supporting a rotating shaft 2, and a sealing means 4, 30 on the side opposite to a sealed fluid source of the radial sliding bearing 11, 25 in a rotation axis direction, for sealing a sealed fluid. Fluid introduction holes 20 are provided in the radial sliding bearing 11, 25 for connecting the sealed fluid source side and the vicinity of the sealing means 4, 30 on the high-pressure fluid side.

3 Claims, 5 Drawing Sheets (51) Int. Cl.
*F16J 15/32* (2016.01)
*F16C 17/02* (2006.01)
*F16C 37/00* (2006.01)
*F16C 17/14* (2006.01)

(52) U.S. Cl.
CPC ............ *F16C 17/14* (2013.01); *F16C 37/002* (2013.01); *F16C 2360/44* (2013.01)

(56) References Cited

U.S. PATENT DOCUMENTS

| | | | | |
|---|---|---|---|---|
| 8,083,500 | B1 * | 12/2011 | Lebkuchner | ............ F04B 17/03 417/423.12 |
| 8,303,184 | B1 * | 11/2012 | Lebkuchner | ........ F04D 13/0626 310/90 |
| 9,328,736 | B2 * | 5/2016 | Lebkuchner | .......... F04D 29/046 |
| 2004/0264819 | A1 * | 12/2004 | Weingord | ............. F16C 17/026 384/107 |
| 2010/0166578 | A1 * | 7/2010 | Watson | ................... F04D 13/10 417/423.3 |
| 2012/0328461 | A1 * | 12/2012 | Lebkuchner | ............ F16C 17/02 417/423.13 |
| 2014/0232070 | A1 | 8/2014 | Takigahira et al. | |

FOREIGN PATENT DOCUMENTS

| | | | | |
|---|---|---|---|---|
| CN | 102165228 | A | | 8/2011 |
| CN | 202392110 | U | | 8/2012 |
| EP | 1577591 | A1 | | 9/2005 |
| JP | 58170971 | A | * | 10/1983 |
| JP | S6237572 | A | | 2/1987 |
| JP | H03175197 | A | | 7/1991 |
| JP | H0519650 | U | | 3/1993 |
| JP | H05302675 | A | | 11/1993 |
| JP | 200088109 | A | | 3/2000 |
| JP | 2002235856 | A | | 8/2002 |
| JP | 2004098719 | A | | 4/2004 |
| JP | WO2013001935 | A1 | | 1/2013 |
| JP | 2013117299 | A | * | 6/2013 .............. F16C 17/02 |
| JP | 2016148351 | A | * | 8/2016 ................ F16J 15/34 |
| JP | 2016166624 | A | * | 9/2016 .............. F04B 39/00 |

OTHER PUBLICATIONS

A First Office Action issued by the State Intellectual Property Office of China dated Jan. 25, 2018 for Chinese counterpart application No. 201580053574.8.
Extended European Search Report (EESR) dated Jan. 30, 2018, issued for European counterpart patent application No. EP15850673.3.
Partial translation of JP 2002-235856 A1 (Hosokawa et al.) by Applicant (paragraphs 0001-0010, 0026-0039, and 0066).

* cited by examiner

SEAL DEVICE

This application is the U.S. National Phase under 35 U.S.C. § 371 of International Application PCT/JP2015/074083, filed Aug. 26, 2015, which claims priority to Japanese Patent Application No. 2014-213251, filed Oct. 18, 2014. The International Application was published under PCT Article 21(2) in a language other than English.

TECHNICAL FIELD

The present invention relates to a seal device, and more particularly, relates to a seal device capable of preventing the concentration of a sealed fluid in the vicinity of a sealing means provided in a seal cavity between a housing and a rotating shaft.

BACKGROUND ART

Figure 5:
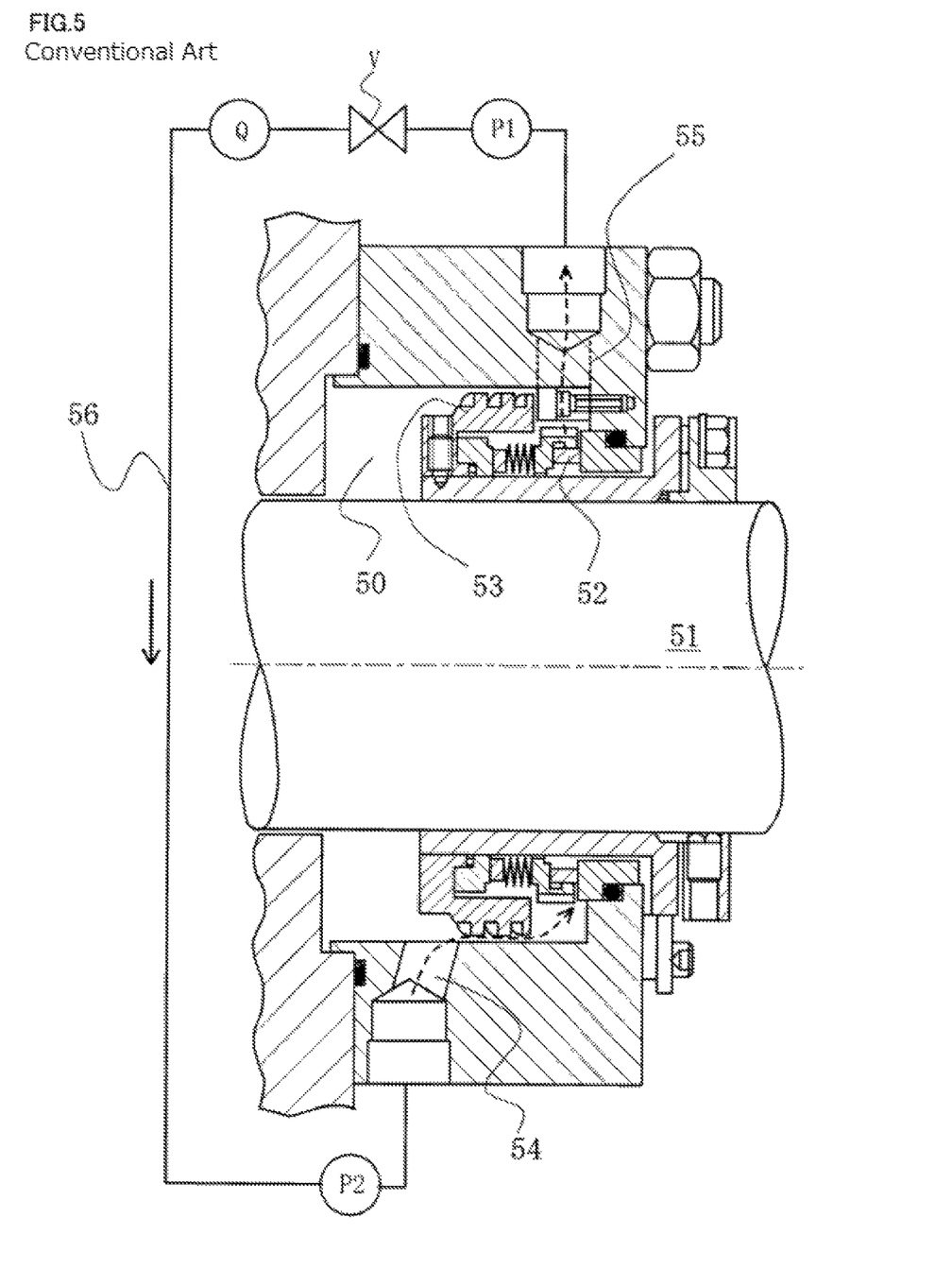
FIG. 5 is a diagram showing a conventional art.

As a sealing means for sealing a seal cavity between a housing and a rotating shaft, mechanical seals, lip-type seals, and the like are known. For example, for a mechanical seal, there is a known seal device in which, in order to cool a rotating-side seal ring and a stationary-side seal ring that slide on each other, as shown in FIG. 5, for example, a pumping ring 53 is provided on a rotating shaft 51, fixed in an axial position different from that of a rotating-side seal ring 52 so that a sealed fluid located in a sealed space 50 flows along an axial direction of the rotating shaft 51, and an inlet hole 54 is provided upstream of the pumping ring 53 and a discharge hole 55 downstream so that the sealed fluid discharged from the discharge hole 55 is returned from the inlet hole 54 into the sealed space 50 through external piping 56 (Hereinafter, referred to as a "conventional art." For example, see Patent Document 1.).

CITATION LIST

Patent Document

Patent Document 1: WO 2013/001935 A1

SUMMARY OF THE INVENTION

Problem to be Solved by the Invention

However, the above-described conventional art is an inside mechanical seal at which a sealed fluid tends to leak in the direction of the inside diameter of a sealing face, and additionally provides the pumping ring 53 on the rotating shaft 51, thus increasing the number of components and also increasing the radial dimension. Further, it is necessary to provide an external circulation device for circulating the sealed fluid through the external piping 56. There also is a problem that this external circulation device is not directly applicable to an outside mechanical seal at which a sealed fluid is present on the inside-diameter side of a sealing face.

The present invention has an object of providing a seal device capable of preventing the concentration of a sealed fluid in the vicinity of a sealing means for sealing a seal cavity between a housing and a rotating shaft to increase the sealing performance of a sliding face and to suppress an increase in sliding torque, thereby to prevent poor lubrication of the sliding face, without increasing the number of components and without providing a large-scale external circulation device.

Means for Solving Problem

To attain the above object, a seal device according to a first aspect of the present invention is a seal device fitted in a seal cavity formed between a housing and a rotating shaft, for sealing a sealed fluid between the housing and the rotating shaft, which includes, in the seal cavity, a radial sliding bearing for supporting the rotating shaft, a sealing means on a side opposite to a sealed fluid source of the radial sliding bearing in a rotation axis direction, for sealing the sealed fluid, and a fluid introduction hole provided in the radial sliding bearing, for connecting the sealed fluid source side and the vicinity of the sealing means on a high-pressure fluid side.

According to this aspect, the concentration of the sealed fluid in the vicinity of a sliding face between a stationary-side seal ring and a rotating-side seal ring can be prevented without increasing the number of components and without providing a large-scale external circulation device. As a result, the formation and the adhesion and accumulation of deposits on the sliding face can be prevented to prevent degradation in sealing performance. Further, an increase in the viscosity of the sealed fluid can be suppressed to prevent an increase in sliding torque. Furthermore, the occurrence of trapped air in the vicinity of the sliding face can be prevented to prevent poor lubrication of the sliding face. Moreover, since the fluid introduction hole is provided in a member constituting a sliding bearing, the device can be reduced in weight.

According to a second aspect of the present invention, the seal device in the first aspect further includes a pumping groove provided in at least one of an outer peripheral surface of the rotating shaft and an inner peripheral surface of the radial sliding bearing, for transferring the sealed fluid from the sealed fluid source side to the sliding face side.

According to this aspect, the concentration of the sealed fluid in the vicinity of the sliding face of the sealing means can be further prevented.

According to a third aspect of the present invention, the seal device in the first aspect further includes a pumping groove provided in at least one of an outer peripheral surface of the rotating shaft and an inner peripheral surface of the radial sliding bearing, for transferring the sealed fluid from the sliding face side to the sealed fluid source side.

According to this aspect, the concentration of the sealed fluid in the vicinity of the sliding face of the sealing means can be further prevented, and by controlling the circulation amount of the sealed fluid, it becomes possible to make the pressure in the vicinity of the sliding face a low pressure, which can contribute to an improvement in sealing performance.

According to a fourth aspect of the present invention, the seal device in any one of the first to third aspects further includes a foreign substance removal filter fitted in an inlet of the fluid introduction hole on the sealed fluid source side.

According to this aspect, the sealed fluid free of foreign substances can be fed to the vicinity of the sliding face or between the radial sliding bearing and the rotating shaft, and roughness of the sliding face due to foreign substances and abnormal wear of the radial sliding bearing can be prevented.

According to a fifth aspect of the present invention, in the seal device in any one of the first to fourth aspects, the sealing means is a mechanical seal provided with a stationary-side seal ring and a rotating-side seal ring that faces and slides on the stationary-side seal ring.

According to this aspect, the sealing function can be performed more reliably.

According to a sixth aspect of the present invention, in the seal device in the fifth aspect, the stationary-side seal ring is fixed in the housing in such a manner as to constitute the radial sliding bearing.

According to this aspect, the number of components can be reduced and the axial length can be reduced.

According to a seventh aspect of the present invention, in the seal device in any one of the first to fourth aspects, the sealing means is a lip-type seal provided with a seal lip member.

According to this aspect, also in the lip-type seal, the concentration of the sealed fluid in the vicinity of a sliding face of the seal lip member can be prevented.

Effect of the Invention

The present invention achieves the following outstanding effects:

(1) The concentration of the sealed fluid in the vicinity of the sliding face between the stationary-side seal ring and the rotating-side seal ring can be prevented without increasing the number of components and without providing a large-scale external circulation device. As a result, the formation and the adhesion and accumulation of deposits on the sliding face can be prevented to prevent degradation in sealing performance. Further, an increase in the viscosity of the sealed fluid can be suppressed to prevent an increase in sliding torque. Furthermore, the occurrence of trapped air in the vicinity of the sliding face can be prevented to prevent poor lubrication of the sliding face. Moreover, since the fluid introduction hole is provided in the member constituting the sliding bearing, the device can be reduced in weight.

(2) The pumping groove for transferring the sealed fluid from the sealed fluid source side to the sliding face side is provided in at least one of the outer peripheral surface of the rotating shaft and the inner peripheral surface of the radial sliding bearing, whereby the concentration of the sealed fluid in the vicinity of the sliding face of the sealing means can be further prevented.

(3) The pumping groove for transferring the sealed fluid from the sliding face side to the sealed fluid source side is provided in at least one of the outer peripheral surface of the rotating shaft and the inner peripheral surface of the radial sliding bearing, whereby the concentration of the sealed fluid in the vicinity of the sliding face of the sealing means can be further prevented, and by controlling the circulation amount of the sealed fluid, it becomes possible to make the pressure in the vicinity of the sliding face a low pressure, which can contribute to an improvement in sealing performance.

(4) The foreign substance removal filter is fitted in the inlet of the fluid introduction hole on the sealed fluid source side, whereby the sealed fluid free of foreign substances can be fed to the vicinity of the sliding face or between the radial sliding bearing and the rotating shaft, and roughness of the sliding face due to foreign substances and abnormal wear of the sliding bearing can be prevented.

(5) The sealing means is the mechanical seal provided with the stationary-side seal ring and the rotating-side seal ring that faces and slides on the stationary-side seal ring, thereby being able to serve the sealing function more reliably.

(6) The stationary-side seal ring is fixed in the housing in such a manner as to constitute the radial sliding bearing, thereby allowing a reduction in the number of components and a reduction in the axial length of the device.

(7) The sealing means is the lip-type seal provided with the seal lip member, whereby the concentration of the sealed fluid in the vicinity of the sliding face of the seal lip member can be prevented also in the lip-type seal.

DESCRIPTION OF EMBODIMENTS

Hereinafter, with reference to the drawings, forms for implementing this invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
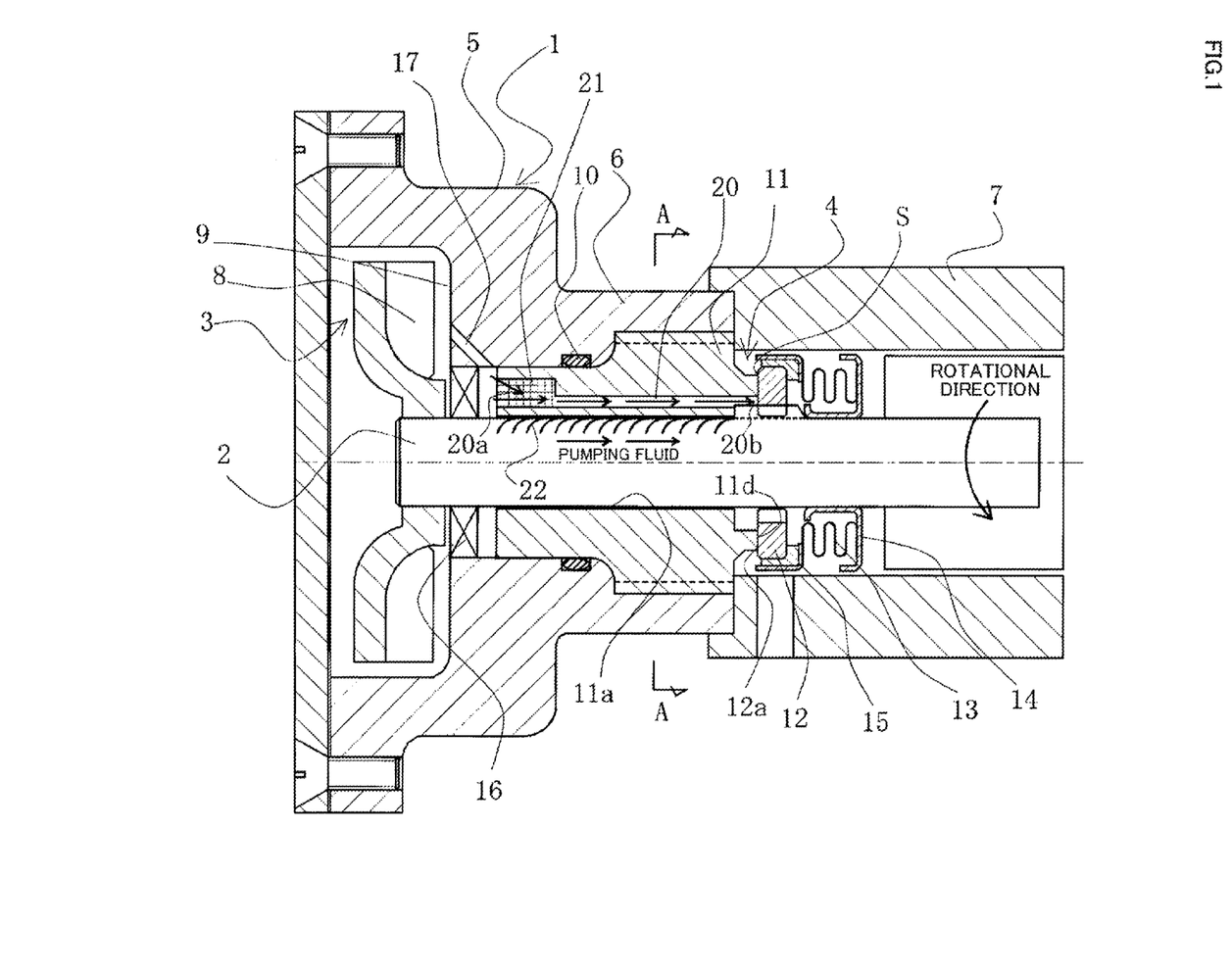
FIG. 1 is a vertical cross-sectional view showing a seal device according to a first embodiment of the present invention.

With reference to FIG. 1, a seal device according to a first embodiment of the present invention will be described.

The first embodiment shown in FIG. 1 represents a case where a seal device according to the present invention is applied to a small water pump. The seal device is disposed next to a pump chamber that force-feeds a liquid.

A sealing means of the seal device is an outside mechanical seal in the form of sealing a sealed fluid on the high-pressure fluid side that tends to leak from the inner periphery of a sealing face (sometimes referred to as a "sliding face" in the present invention) toward the outer periphery.

In FIG. 1, a pump part 3 is formed on the one-end side of a rotating shaft 2 provided in a housing 1 (the left side in FIG. 1), and a mechanical seal 4, a sealing means, on the other-end side (the right side in FIG. 1).

The housing 1 has a pump housing 5 in which the pump part 3 is mainly housed, and a bearing housing 6 in which a member constituting a sliding bearing is housed.

The member constituting the sliding bearing will be described in detail below.

A seal cover 7 that can accommodate the mechanical seal 4 is attached to the other-end side of the housing 1 (the right side in FIG. 1).

In the pump part 3, the pump housing 5 has a substantially C shape in cross section, and houses a rotary impeller 8 and forms a pump chamber 9 in its interior housing space. The rotary impeller 8 is driven to rotate by a drive force of a motor part not shown via the rotating shaft 2 to force-feed the liquid to a predetermined location.

The bearing housing 6 has a substantially cylindrical shape in cross section, and houses a stationary-side seal ring 11 formed to constitute a radial sliding bearing in its interior housing space. An O-ring 10 is fitted between an inner peripheral surface of the bearing housing 6 and an outer peripheral surface of the stationary-side seal ring 11 for sealing.

The stationary-side seal ring 11 demarcates the pump chamber 9 and a sealing face S of the mechanical seal 4, supports one end of the rotating shaft 2, and has a predetermined outside diameter and thickness for the necessity to have a certain strength. Therefore, a through hole 11a for inserting the rotating shaft 2 on the pump part 3 side is formed in a central portion of the stationary-side seal ring 11, which constitutes a radial sliding bearing at a portion of the through hole 11a to rotatably support the rotating shaft 2.

The liquid in the pump chamber 9 leaks to the mechanical seal 4 side through a gap between the through hole 11a and the rotating shaft 2.

In this embodiment, the stationary-side seal ring 11 also serves as a radial sliding bearing, thus allowing a reduction in the number of components and a reduction in the axial length.

The stationary-side seal ring 11 has self-lubricity, wear resistance, and other properties in addition to having a mechanical strength, and is formed from a material selected from carbon, SiC, cemented carbide, and the like, for example. The gap between a sliding bearing portion of the inner periphery 11a of the stationary-side seal ring 11 and the outer periphery of the rotating shaft 2, which is determined by taking its operating temperature or material, and the like into account, is determined according to a gap set in common sliding bearings.

Figure 2:
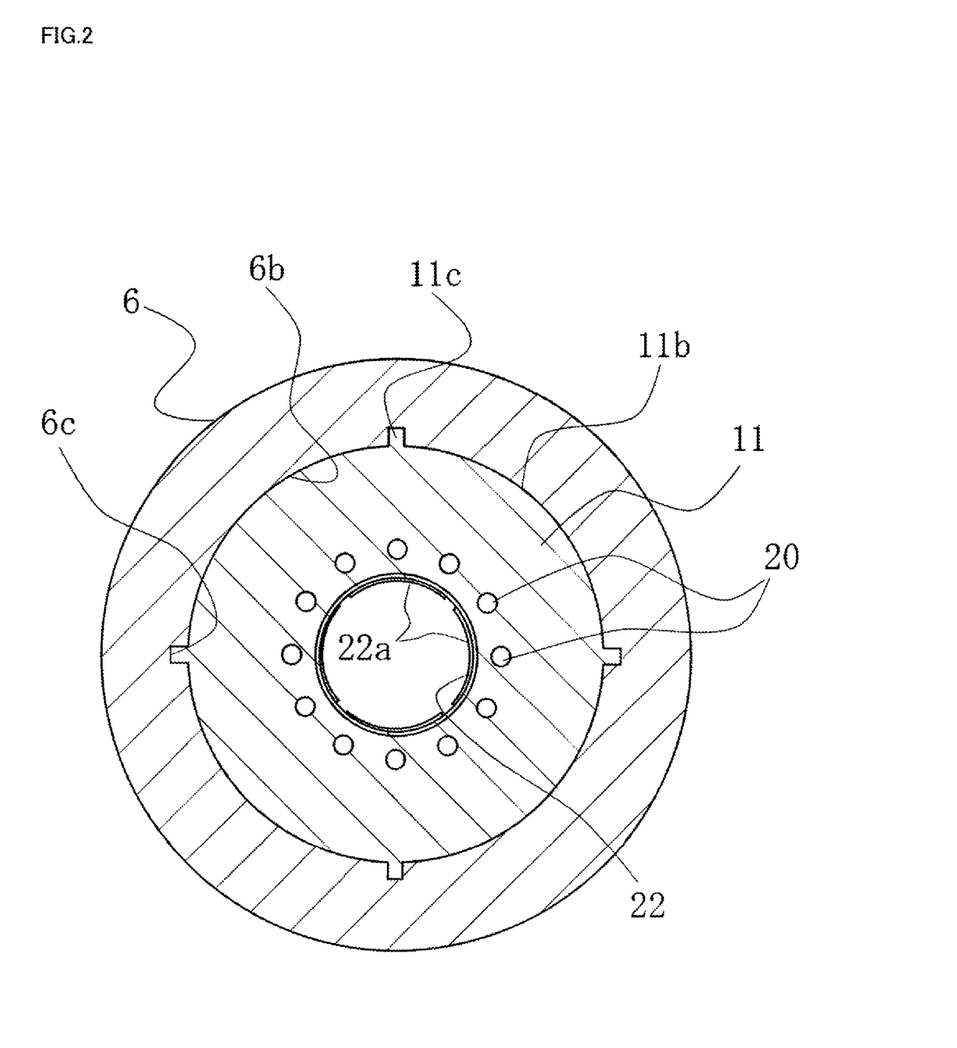
FIG. 2 is a cross-sectional view along A-A in FIG. 1.

Further, as shown in FIG. 2, in order to stop rotation and prevent axial movement of the stationary-side seal ring 11, protrusions 11c (or recessed portions) may be provided at an outer periphery 11b of the stationary-side seal ring 11, recessed portions 6c (or protrusions) may be provided at an inner periphery 6b of the bearing housing 6 side facing the protrusions 11c (or recessed portions), and they may be engaged with each other to prevent the rotation and axial movement of the stationary-side seal ring 11.

A rotating-side seal ring 12 to face and slide on a sliding face 11d (sealing face) of the stationary-side seal ring 11 is provided on the side opposite to the pump part 3 side (sometimes referred to as the "sealed fluid source side" in the present invention) of the stationary-side seal ring 11. Like the stationary-side seal ring 11, the rotating-side seal ring 12 has self-lubricity, wear resistance, and other properties in addition to having a mechanical strength, and is selected from among carbon, SiC, cemented carbide, and the like, for example, with consideration given to conformability to the opposing member, and the like.

A pressing member 13 for axially biasing the rotating-side seal ring 12 toward the pump part 3 side is fitted so that a sliding face 12a of the rotating-side seal ring 12 is pressed against the sliding face 11d of the stationary-side seal ring 11.

In this example, the pressing member 13 is formed from a bellows. One end of the bellows 13 is joined to a collar 14, and the other end is joined to a retainer 15. The rotating-side seal ring 12 is shrink-fitted or pressed in an end face of the retainer 15.

The pressing member is not limited to a bellows. A coil spring may be used instead as a matter of course.

The collar 14 is formed from a metal and has a ring shape, and is fixed to an outer peripheral surface of the rotating shaft 2.

The bellows 13 is formed in an accordion cylindrical shape in its entirety by aligning a plurality of metal diaphragm plates formed in a corrugated annular shape by blanking or the like, and joining outside-diameter portions and inside-diameter portions of adjacent diaphragm plates alternately by gas welding or the like, and is integrally joined at one end to the collar 14 side by gas welding or the like. Instead of a welded bellows formed in the above-described manner, a molded bellows formed by plastically deforming a metal pipe into an accordion cylindrical shape in its entirety, or a bellows formed by another method may be used.

By the rotation of the rotary impeller 8, an axial force acts on the rotating shaft 2. Thus, as a member to suppress this, a thrust bearing 16 is provided, located between the rotating shaft 2 and the pump housing 5 on the pump part 3 side of the stationary-side seal ring 11.

In this case, the thrust bearing 16 is configured not to obstruct the flow of the fluid circulating through the radial sliding bearing (stationary-side seal ring 11). Further, a communication hole 17 is provided in the pump housing 5 for connecting the pump chamber 9 and the pump part 3 side of the stationary-side seal ring 11.

Alternatively, the thrust bearing 16 may be provided on the side opposite to the pump chamber 9 across the mechanical seal 4, or may be provided on each side.

The sealed fluid in the vicinity of the sliding face S of the mechanical seal 4 is in a concentrated state since the sliding face S is far from the pump chamber 9 and the sealed fluid is in a state of being separated by the stationary-side seal ring 11. It is known that when a silicate-based coolant is used as the sealed fluid, for example, with the sealed fluid being in a concentrated state, a deposit forms on the sliding face S of the mechanical seal 4, adhering to and accumulating on the sliding face S, and becomes a factor in degrading the sealing performance. Further, the viscosity of the sealed fluid increases, increasing sliding torque. Furthermore, since the sealed fluid is hard to circulate in the vicinity of the sliding face S, trapped air can form, causing a trouble that the sliding face S has poor lubrication.

The present invention is an outside mechanical seal at which a sealed fluid tends to leak toward the outside diameter of a sealing face S, for example, which prevents the concentration of the sealed fluid in the vicinity of the sliding face S between the stationary-side seal ring 11 and the rotating-side seal ring 12 to increase the sealing performance of the sliding face S and to suppress an increase in sliding torque, thereby to prevent poor lubrication of the sliding face S, without increasing the number of components and without providing a large-scale external circulation device. For this, the stationary-side seal ring 11 is placed in such a manner as to constitute a radial sliding bearing for supporting the rotating shaft 2 between the sliding face S between the stationary-side seal ring 11 and the rotating-side seal ring 12 and the pump chamber 9 side, and fluid introduction holes 20 for connecting the pump chamber 9 side and the vicinity of the sliding face S on the high-pressure fluid side are provided in the stationary-side seal ring 11 constituting the radial sliding bearing.

In the present invention, the "high-pressure fluid side of the sliding face S" means the side on which the sealed fluid is present. By contrast, the low-pressure fluid side of the sliding face S means the atmosphere side.

Since the sealed fluid is present on the inside-diameter side of the sliding face S in the outside mechanical seal, outlets 20b of the fluid introduction holes 20 are set to be located on the inside-diameter side of the sliding face S. The fluid introduction holes 20, which are not particularly limited in cross-sectional shape, is circular, for example, and are preferably provided circumferentially to feed the sealed fluid evenly to the vicinity of the sliding face S.

Foreign substance removal filters 21 are placed in inlets 20a of the fluid introduction holes 20 on the pump chamber 9 side (the sealed fluid source side). By the placement of the foreign substance removal filters 21, the sealed fluid free of foreign substances can be fed to the vicinity of the sliding face S or between the through hole 11a of the stationary-side seal ring 11 constituting the sliding bearing and the rotating shaft 2. This can prevent roughness of the sliding face S due to foreign substances and abnormal wear of the sliding bearing. Since the foreign substance removal filters 21 are present on the pump chamber 9 side, that is, the foreign substance removal filters 21 are placed in the vicinity of the rotary impeller 8, pressure fluctuations occur around the foreign substance removal filters 21 as the rotary impeller 8 rotates. Even when the foreign substance removal filters 21 are clogged with foreign substances, the fluctuations act to cause the foreign substances to be discharged, preventing clogging with foreign substances.

In this example, the inlets 20a are formed larger radially or circumferentially to facilitate the introduction of the sealed fluid from the pump chamber 9. The foreign substance removal filters 21 are placed in the inlets 20a formed larger.

The shape of the inlets 20a of the fluid introduction holes 20 may be a spiral shape along the rotational direction of the sealed fluid to facilitate the introduction of the sealed fluid rotating with the rotation of the rotary impeller 8 into the fluid introduction holes 20.

The fluid introduction holes 20 do not need to be parallel to the central axis of the rotating shaft, and may be inclined toward the central axis from the inlets 20a to the outlets 20b, for example. Alternatively, they may be inclined away from the central axis from the inlets 20a to the outlets 20b.

Pumping grooves 22 for transferring the sealed fluid from the pump chamber 9 side (the sealed fluid source side) to the sliding face S side are provided in the outer peripheral surface of the rotating shaft 2 facing the through hole 11a of the stationary-side seal ring 11. The pumping grooves 22 only need to be able to transfer the sealed fluid from the pump chamber 9 side to the sliding face S side by the rotation of the rotating shaft 2, and is not limited particularly. In this example, the pumping grooves 22 are formed by providing a plurality of fine inclined grooves axially at regular intervals. The pumping grooves 22 may be provided in the entire outer peripheral surface of the rotating shaft 2. In this example, however, as shown in FIG. 2, a plurality of inclined grooves formed by fine recesses and protrusions is provided at regular intervals in four circumferentially evenly-spaced shallow rectangular grooves 22a. Alternatively, they may be provided in the through hole 11a of the stationary-side seal ring 11 constituting the radial sliding bearing, or may be provided in both of the outer peripheral surface of the rotating shaft 2 and the through hole 11a.

When the water pump configured as described above is operated, the rotary impeller 8 of the pump part 3 is driven to rotate by the drive force of the motor part via the rotating shaft 2, force-feeding the liquid to the predetermined location. At that time, the high-pressure liquid in the pump chamber 9 leaks to the mechanical seal 4 side through the gap of the sliding bearing between the through hole 11a of the stationary-side seal ring 11 and the outer peripheral surface of the rotating shaft 2, but is sealed at the sliding face S and prevented from leaking outside.

On the other hand, the high-pressure sealed fluid in the pump chamber 9 is introduced directly to the vicinity of the sliding face S on the high-pressure fluid side through the fluid introduction holes 20. Further, the sealed fluid is transferred from the pump chamber 9 side to the sliding face S side by the pumping action of the pumping grooves 22 accompanying the rotation of the rotating shaft 2.

Thus, the sealed fluid on the pump chamber 9 side is actively introduced to the vicinity of the sliding face S on the high-pressure fluid side, and the sealed fluid in the vicinity of the sliding face S is not concentrated.

The amount of the sealed fluid fed by the fluid introduction holes 20 and the pumping grooves 22 can be controlled by the diameter of the fluid introduction holes 20 and the pumping amount of the pumping grooves 22 (e.g. the groove depth or the like). Thus the degree of concentration of the sealed fluid in the vicinity of the sliding face S can be controlled, which can contribute to an improvement in sealing performance.

The first embodiment described above achieves the following effects:

(1) By providing the fluid introduction holes 20 in the member constituting the sliding bearing, and by additionally providing the pumping grooves 22 in the rotating shaft 2, the concentration of the sealed fluid in the vicinity of the sliding face S between the stationary-side seal ring 11 and the rotating-side seal ring 12 can be prevented without increasing the number of components and without providing a large-scale external circulation device. As a result, the formation and the adhesion and accumulation of deposits on the sliding face S can be prevented to prevent degradation in sealing performance. Further, an increase in the viscosity of the sealed fluid can be suppressed to prevent an increase in sliding torque. Furthermore, the occurrence of trapped air in the vicinity of the sliding face S can be prevented to prevent poor lubrication of the sliding face S.

(2) By placing the foreign substance removal filters 21, the sealed fluid free of foreign substances can be fed to the vicinity of the sliding face S or between the through hole 11a of the stationary-side seal ring 11 constituting the sliding bearing and the rotating shaft 2, and roughness of the sliding face S due to foreign substances and abnormal wear of the sliding bearing can be prevented.

(3) Since the amount of the sealed fluid fed to the vicinity of the sliding face S can be controlled by the diameter of the fluid introduction holes 20 and the pumping amount of the pumping grooves 22 (e.g. the groove depth or the like), the degree of concentration of the sealed fluid in the vicinity of the sliding face S can be controlled, which can contribute to an improvement in sealing performance.

(4) The stationary-side seal ring 11 also serves as the sliding bearing, thereby allowing a reduction in the number of components and a reduction in the axial length.

(5) By providing the fluid introduction holes 20 in the stationary-side seal ring 11 also serving as the sliding bearing, the device can be reduced in weight.

Second Embodiment

Figure 3:
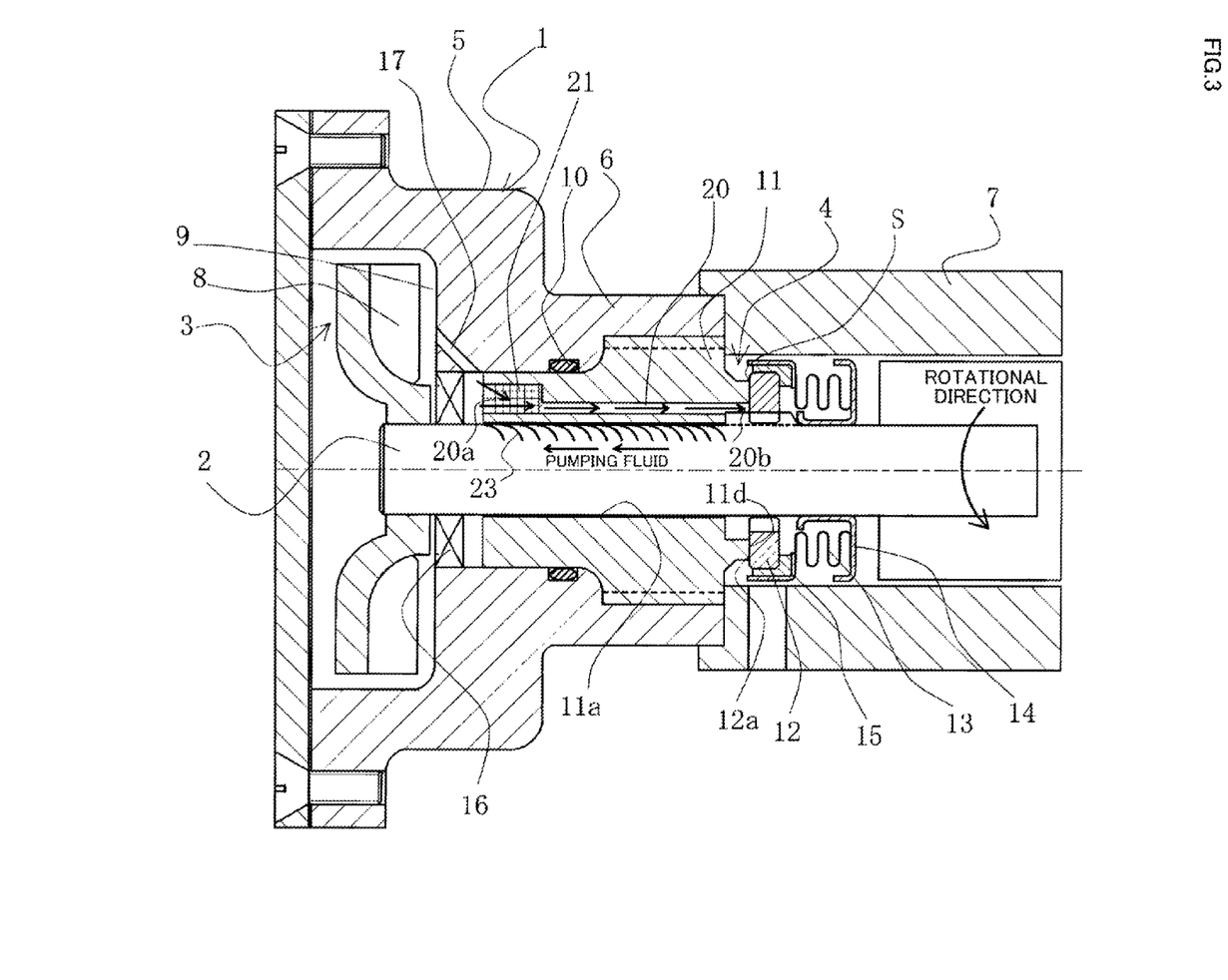
FIG. 3 is a vertical cross-sectional view showing a seal device according to a second embodiment of the present invention.

With reference to FIG. 3, a seal device according to a second embodiment of the present invention will be described.

The seal device according to the second embodiment is different from the first embodiment shown in FIGS. 1 and 2 in that pumping grooves in an outer peripheral surface of a rotating shaft are configured to transfer a sealed fluid from the sliding face S side to the pump chamber side (the sealed fluid source side), and is otherwise basically identical to the first embodiment. The same members as those in FIGS. 1 and 2 are denoted by the same reference numerals, and will not be redundantly described.

In FIG. 3, pumping grooves 23 for transferring a sealed fluid from the sliding face S side to a pump chamber 9 (the sealed fluid source side) are provided in an outer peripheral surface of a rotating shaft 2. The pumping grooves 23 only need to be able to transfer the sealed fluid from the sliding face S side to the pump chamber 9 side by the rotation of the rotating shaft 2, and is not limited particularly. In this example, as in the first embodiment, the pumping grooves 23 are configured by providing a plurality of fine inclined grooves axially at regular intervals. The pumping grooves 23 may be provided in the entire outer peripheral surface of the rotating shaft 2. In this example, however, as in the first embodiment, a plurality of inclined grooves formed by fine recesses and protrusions is provided at regular intervals in four circumferentially evenly-spaced shallow rectangular grooves. Alternatively, they may be provided in a through hole 11a of a stationary-side seal ring 11 constituting a sliding bearing, or may be provided in both of the outer peripheral surface of the rotating shaft 2 and the through hole 11a.

When a water pump configured as described above is operated, a rotary impeller 8 of a pump part 3 is driven to rotate by the drive force of a motor part via the rotating shaft 2, force-feeding a liquid to a predetermined location. At that time, a high-pressure liquid in the pump chamber 9 leaks to the mechanical seal 4 side through a gap of the sliding bearing between the through hole 11a of the stationary-side seal ring 11 and the outer peripheral surface of the rotating shaft 2, but is sealed at a sliding face S and prevented from leaking outside.

On the other hand, the high-pressure sealed fluid in the pump chamber 9 is introduced directly to the vicinity of the sliding face S on the high-pressure fluid side through fluid introduction holes 20. Further, the sealed fluid is transferred from the sliding face S side to the pump chamber 9 side by the pumping action of the pumping grooves 23 accompanying the rotation of the rotating shaft 2.

Thus, the sealed fluid on the pump chamber 9 side is actively circulated to the vicinity of the sliding face S, and the sealed fluid in the vicinity of the sliding face S is not concentrated.

The amount of the sealed fluid circulated by the fluid introduction holes 20 and the pumping grooves 23 can be controlled by the diameter of the fluid introduction holes 20 and the pumping amount of the pumping grooves 23 (e.g. the groove depth or the like). Thus it becomes possible to make the pressure in the vicinity of the sliding face S a low pressure, which can contribute to an improvement in sealing performance.

The second embodiment described above achieves the following effects:

(1) By providing the fluid introduction holes 20 in a member constituting a radial sliding bearing, and by additionally providing the pumping grooves 23 in the rotating shaft 2, the concentration of the sealed fluid in the vicinity of the sliding face S between the stationary-side seal ring 11 and a rotating-side seal ring 12 can be prevented without increasing the number of components and without providing a large-scale external circulation device. As a result, the formation and the adhesion and accumulation of deposits on the sliding face S can be prevented to prevent degradation in sealing performance. Further, an increase in the viscosity of the sealed fluid can be suppressed to prevent an increase in sliding torque. Furthermore, the occurrence of trapped air in the vicinity of the sliding face S can be prevented to prevent poor lubrication of the sliding face S.

(2) By placing foreign substance removal filters 21, the sealed fluid free of foreign substances can be fed to the vicinity of the sliding face S or between the through hole 11a of the stationary-side seal ring 11 constituting the radial sliding bearing and the rotating shaft 2, and roughness of the sliding face S due to foreign substances and abnormal wear of the sliding bearing can be prevented.

(3) Since the amount of the sealed fluid circulated to the vicinity of the sliding face S can be controlled by the diameter of the fluid introduction holes 20 and the pumping amount of the pumping grooves 23 (e.g. the groove depth or the like), it becomes possible to make the pressure in the vicinity of the sliding face S a low pressure, which can contribute to an improvement in sealing performance.

(4) The stationary-side seal ring 11 also serves as the radial sliding bearing, thereby allowing a reduction in the number of components and a reduction in the axial length.

(5) By providing the fluid introduction holes 20 in the stationary-side seal ring 11 also serving as the radial sliding bearing, the device can be reduced in weight.

Third Embodiment

Figure 4:
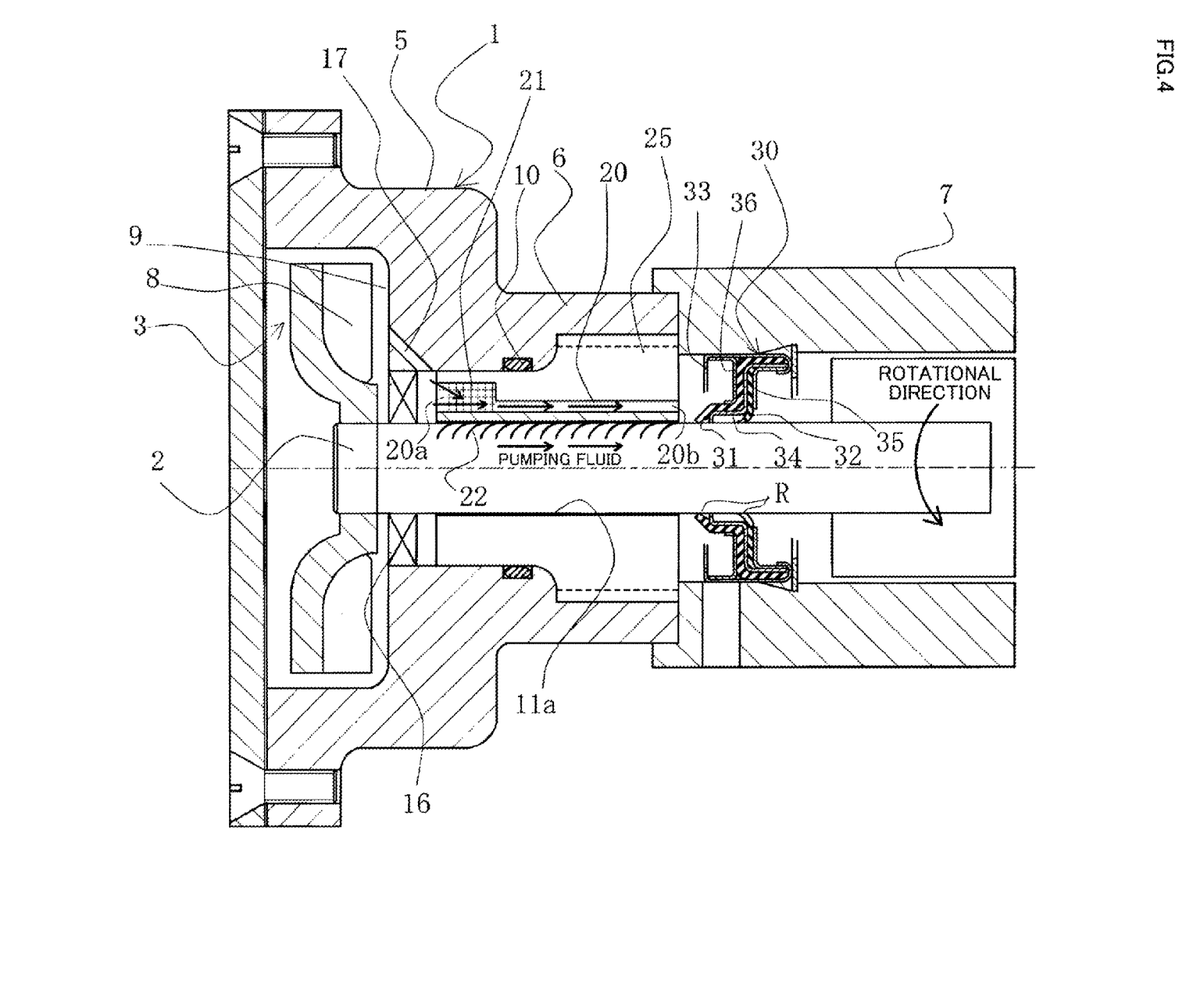
FIG. 4 is a vertical cross-sectional view showing a seal device according to a third embodiment of the present invention.

With reference to FIG. 4, a seal device according to a third embodiment of the present invention will be described.

The seal device according to the third embodiment is different from the first embodiment shown in FIGS. 1 and 2 in that a lip-type seal is used as a sealing means in place of a mechanical seal, and is otherwise basically identical to the first embodiment. The same members as those in FIGS. 1 and 2 are denoted by the same reference numerals, and will not be redundantly described.

In FIG. 4, instead of the stationary-side seal ring 11 also serving as the radial sliding bearing as in the case of the first embodiment shown in FIGS. 1 and 2, a sealing means and a bearing for respective purposes are provided.

A lip-type seal 30, a sealing means, is fitted in a seal cover 7 and is slidably in close contact with a peripheral surface of a rotating shaft 2, and has a two-stage lip structure having a first seal lip member 31 made of a rubber material disposed on the pump part 3 side and a second seal lip member 32 made of a resin material disposed on the side opposite to the pump part 3.

The lip-type seal 30 has six components, a cartridge 33 fitted on an inner periphery of the seal cover 7, the first seal lip member 31 made of a rubber material fitted and held in the cartridge 33 in an unbonded state, a case 34 fitted and held in the first seal lip member 31 in an unbonded state, the second seal lip member 32 made of a resin material caulked and held in the case 34, a back-up ring 35 caulked and held in the case 34 likewise and supporting the second seal lip member 32, and an adapter 36 fitted in the cartridge 33 on the pump part 3 side of the first seal lip member 31, thereby to prevent the first seal lip member 31 from coming out of the cartridge 33.

Fluid introduction holes 20 for connecting the pump chamber 9 side and the vicinities of sliding faces R of the first seal lip member 31 and the second seal lip member 32 are provided in a radial sliding bearing 25 supporting the rotating shaft 2, as in the first embodiment.

A sealed fluid in the vicinities of the sliding faces R of the first seal lip member 31 and the second seal lip member 32 on an outer surface of the rotating shaft 2 is in a concentrated state since the sliding faces R are far from a pump chamber 9, and the sealed fluid is separated by the radial sliding bearing 25. It is known that when a silicate-based coolant is used as the sealed fluid, for example, with the sealed fluid being in a concentrated state, deposits form on the sliding faces R, adhering to and accumulating on the sliding faces R, and become a factor in degrading the sealing performance. Further, the viscosity of the sealed fluid increases, increasing sliding torque. Furthermore, since the sealed fluid is hard to circulate in the vicinity of the sliding face R, trapped air can form, causing a trouble that the sealing faces R have poor lubrication.

The high-pressure sealed fluid in the pump chamber 9 is introduced directly to the vicinities of the sliding faces R through fluid introduction holes 20. Further, by the pumping action of pumping grooves 22 accompanying the rotation of the rotating shaft 2, the sealed fluid is transferred from the pump chamber 9 side to the sliding faces R side.

Thus, the sealed fluid on the pump chamber 9 side is actively introduced to the vicinities of the sliding faces R on the high-pressure fluid side, and the sealed fluid in the vicinities of the sliding faces R is not concentrated.

Although the embodiments of the present invention have been described above with reference to the drawings, the specific configuration is not limited to these embodiments. Any change or addition without departing from the scope of the present invention is included in the present invention.

For example, the embodiments have been described on a case where a seal device according to the present invention is applied to a small water pump in which it is disposed next to a pump chamber for force-feeding a liquid, which is not limiting. It may be applied to an oil pump or the like, for example.

Further, for example, the first and second embodiments have been described with an outside mechanical seal at which a sealed fluid tends to leak in the direction of the outside diameter of a sealing face S as an example, which is not limiting. Fluid introduction holes of the present invention can be provided in an inside mechanical seal at which a sealed fluid tends to leak in the direction of the inside diameter of a sealing face S.

Furthermore, for example, the third embodiment has been described on a case where a lip seal is placed in the seal cover 7 to cause lip members to slide on the rotating shaft 2, which is not limiting. A structure in which a lip seal is placed on the rotating shaft 2 to slide on the seal cover 7 or a sliding bearing may be adopted.

Moreover, for example, the embodiments have been described on a case where a large number of fluid introduction holes having a circular cross-sectional shape are provided circumferentially, which is not limiting. For example, two to three fluid introduction holes having an arc-shaped cross-sectional shape may be provided circumferentially.

REFERENCE SIGN LIST 1 housing
2 rotating shaft
3 pump part
4 mechanical seal
5 pump housing
6 bearing housing
7 seal cover
8 rotary impeller
9 pump chamber
10 O-ring
11 stationary-side seal ring
12 rotating-side seal ring
13 pressing member (bellows)
14 collar
15 retainer
16 thrust bearing
17 communication hole
20 fluid introduction hole
21 foreign substance removal filter
22 pumping groove
23 pumping groove
25 radial sliding bearing
30 lip-type seal
31 first seal lip member
32 second seal lip member
33 cartridge
34 case
35 back-up ring
36 adapter
S sliding face
R sliding face

The invention claimed is:

1. A seal device fitted in a seal cavity formed between a housing and a rotating shaft, for sealing a sealed fluid between the housing and the rotating shaft, the seal device comprising:
  in the seal cavity, a radial sliding bearing for supporting the rotating shaft;
  a sealing means on a side opposite to a sealed fluid source of the radial sliding bearing in a rotation axis direction, for sealing the sealed fluid, wherein the sealing means is a mechanical seal constituted by:
    a stationary-side seal ring fixed in the housing and constituting the radial sliding bearing,
    a rotating-side seal ring facing and sliding on a sliding face of the stationary-side seal ring, and
    a pressing member for axially biasing the rotating-side seal ring toward and against the sliding face of the stationary-side seal ring, wherein the sliding face is a sealing face and separates a high-pressure fluid side where the sealed fluid is present and a low-pressure fluid side which is an atmosphere side;
  wherein a fluid introduction hole is provided in the radial sliding bearing and has an inlet on the sealed fluid source side and an outlet on the high-pressure fluid side in a manner fluidly connecting the sealed fluid source side and the high-pressure fluid side of the sliding face of the sealing means, wherein the sealed fluid source side is fluidly separated from the low-pressure fluid side by the radial sliding bearing and is fluidly connected to the high-pressure fluid side through the fluid introduction hole of the radial sliding bearing,
  wherein a foreign substance removal filter is fitted in the inlet of the fluid introduction hole of the radial sliding bearing on the sealed fluid source side.

2. The seal device according to claim 1, further comprising a pumping groove provided in at least one of an outer peripheral surface of the rotating shaft and an inner peripheral surface of the radial sliding bearing, for transferring the sealed fluid from the sealed fluid source side to the high-pressure fluid side of the sliding face.

3. The seal device according to claim 1, further comprising a pumping groove provided in at least one of an outer peripheral surface of the rotating shaft and an inner peripheral surface of the radial sliding bearing, for transferring the sealed fluid from to the high-pressure fluid side of the sliding face to the sealed fluid source side.

* * * * *